United States Patent
Sharp

[15] 3,707,311
[45] Dec. 26, 1972

[54] ANTI-LOCK BRAKE SYSTEMS FOR WHEELED VEHICLES

[72] Inventor: Denis Sharp, East Grinstead, England

[73] Assignee: U.S. Philips Corporation

[22] Filed: Aug. 19, 1970

[21] Appl. No.: 65,163

[30] Foreign Application Priority Data

Aug. 22, 1969 Great Britain.....................42,022/69

[52] U.S. Cl. ........................303/21 CG, 188/181 A
[51] Int. Cl. ...............................................B60t 8/12
[58] Field of Search ..................188/181; 303/20, 21; 324/160–162; 340/262–263

[56] References Cited

UNITED STATES PATENTS

| | | |
|---|---|---|
| 3,017,145 | 1/1962 | Yarber.............................303/21 P |
| 3,275,384 | 9/1966 | Hirzel..............................303/21 EB |
| 3,578,819 | 5/1971 | Atkins..............................303/21 BE |
| 3,556,610 | 1/1971 | Leiber................................303/21 P |

*Primary Examiner*—George A. Halvosa
*Assistant Examiner*—Stephen G. Kunin
*Attorney*—Frank R. Trifari

[57] ABSTRACT

An anti-lock vehicle brake control system includes a control circuit that energizes the brake solenoid when the wheel deceleration exceeds a reference value. The normal energization period of the solenoid is determined by the time it takes for the released wheel to again reach the reference value speed. On a slippery road it takes longer for the wheel to reach the reference value. When the normal energization period exceeds a given time period indicative that braking occurs on a slippery road, the control circuit extends the period of solenoid energization so that the wheel speed approximates the vehicle speed before the brakes are reapplied.

8 Claims, 10 Drawing Figures

INVENTOR.

DENIS SHARP

BY

*Frank C. Infari*

AGENT

INVENTOR.
DENIS SHARP

AGENT

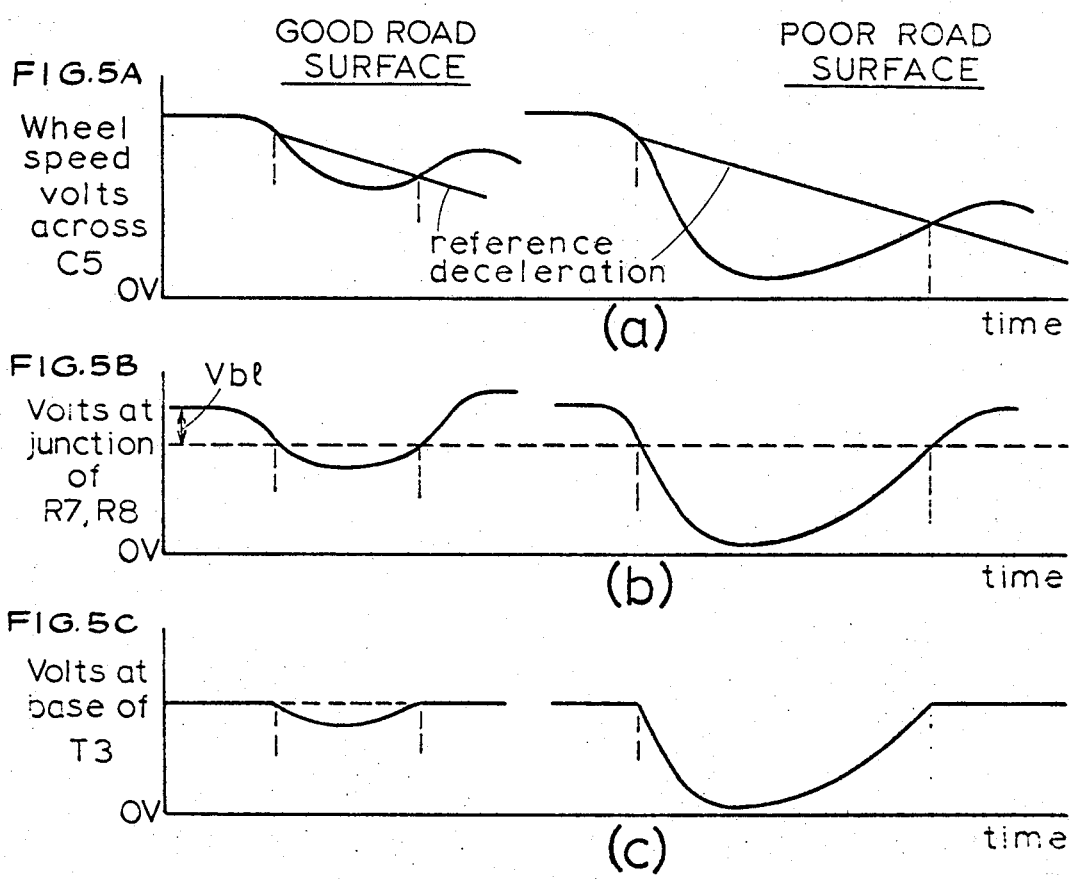

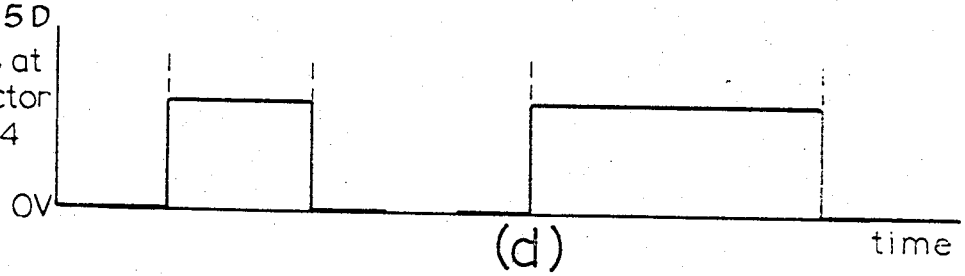
FIG.5D Volts at collector of T4
(d)
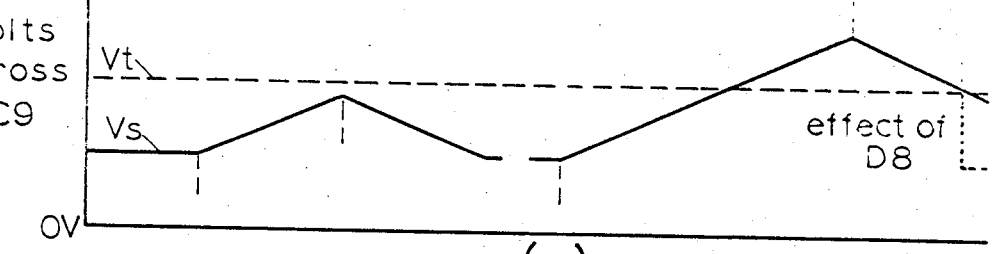
FIG.5E Volts across C9
Vt
Vs
effect of D8
(e)
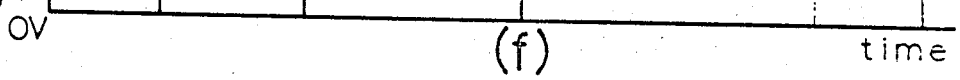
FIG.5F Volts at collector of T10
extended output
(f)

ANTI-LOCK BRAKE SYSTEMS FOR WHEELED VEHICLES

This invention relates to anti-lock brake systems for wheeled vehicles, that is, brake systems including means for improving braking performance of a vehicle by relieving the braking pressure applied to a road wheel of the vehicle if the wheel tends to lock on a slippery surface when the brake is applied and then increasing the braking pressure again without any action being taken (by a person using the brake). Such systems can be successful in reducing the risk of skidding due to wheel lock and in maintaining directional control during braking, and can also reduce braking distances.

The invention relates more particularly to anti-lock vehicle brake systems of the above character comprising, for use in conjunction with a vehicle wheel and associated wheel brake, wheel movement sensing means which are responsive to produce an electrical output when wheel deceleration exceeds a predetermined value and control valve means which is arranged for actuation in response to said electrical output to relieve the braking pressure applied from a fluid pressure source of the system to the wheel brake. The wheel movement sensing means is further responsive to terminate said electrical output to release said control valve means and thereby allow braking pressure to be reapplied to the wheel brake as a function of a particular criterion related to wheel rotational movement subsequent to the relief of braking pressure.

The wheel movement sensing means can comprise the combination of a wheel movement sensor for producing electrical signals related (e.g. proportional) to rotational movement of the wheel and control circuit means which is responsive to said electrical signals to produce said electrical output when wheel deceleration, as signified by the electrical signals from the wheel movement sensor, exceeds said predetermined value. Alternatively, the wheel movement sensing means can comprise a mechanical inertia sensor having a control member which is displaceable to actuate a switch contact to cause the production of said electrical output when wheel deceleration is in excess of said predetermined value.

The predetermined value of wheel deceleration may be made slightly greater than that which the wheel can achieve without skidding if braked on a surface having good adhesion. The control valve means could then be released to allow braking pressure to be reapplied when, as said particular criterion, the wheel reaches the speed it would have been doing if it had continued to decelerate at said predetermined value from the instant when the control valve means was actuated. The mean rate of deceleration of the wheel will approximate said predetermined value of deceleration. An anti-lock brake system of the above character, having a wheel movement sensor and control circuit means for effecting this mode of operation in a recurrent anti-lock cycle, is disclosed in co-pending U.S. Pat. application No. 884,551, filed Dec. 12, 1969. In another mode of operation of the system disclosed in this co-pending patent application, release of the control valve means following its actuation due to the wheel deceleration exceeding said predetermined value, is effected when, as said particular criterion, the wheel starts to reaccelerate. Mechanical inertia sensors can also be adapted to provide these two modes of operation for anti-lock vehicle brake systems. With such systems it will be apparent that the control valve means is actuated in each anti-lock cycle for a duration which will vary automatically in accordance with prevailing road surface conditions. This is so because the more slippery a road surface is, the longer it will take for a road wheel to recover (i.e. become free-rolling again) following the relief of braking pressure. However, although such systems can be designed to give an optimum performance for reducing the risk of skidding on road surfaces having a particular coefficient of friction, it becomes difficult to achieve an optimum performance over a wide range of different road surfaces having widely varying coefficients of friction. The reason for this difficulty may be explained as follows. In order for an anti-lock vehicle brake system to be at least as effective as a conventional brake system on road surfaces having good adhesion, it becomes necessary to select the predetermined value of wheel deceleration so that, as aforesaid, it is slightly greater than that which the wheel could achieve without skidding if braked on such a road surface. On road surfaces having good adhesion wheel slip is small so that vehicle deceleration approximates wheel deceleration and it is therefore also at said predetermined value. However, on slippery road surfaces there is far greater wheel slip so that for a selected value of wheel deceleration which is suitable for a good road surface, the vehicle will be decelerating far more slowly than the wheel so that the vehicle could still be moving at considerable speed when the wheel ceases to rotate due to the anti-lock braking action at said predetermined level of wheel deceleration. Conversely, it will be apparent that if said predetermined value of wheel deceleration is chosen to provide optimum performance on slippery road surfaces, that is, it is reduced so that wheel deceleration and vehicle deceleration are approximately the same in this instance, then such a lesser value of wheel deceleration would mean that on a good road surface the anti-lock brake system would be less efficient than a conventional vehicle brake system.

The present invention proposes an anti-lock vehicle brake system of the character referred to in which the duration that the control valve means thereof is actuated in each anti-lock cycle is dependent on prevailing road surface conditions, wherein means are included for improving the performance of the system over a wider range than hitherto of road surface having different coefficients of friction.

This is achieved in accordance with the present invention by providing the system with timing means which are operable to increase the length of time that the control valve means is actuated in the event that the duration of said electrical output exceeds a predetermined length of time which is indicative that braking is being effected on a surface having poor adhesion. The effect of said timing means is to cause the mean rate of deceleration of the wheel to become less than said predetermined value of deceleration so that vehicle and wheel deceleration are closer than previously for slippery road surfaces.

In carrying out the invention said timing means can comprise an RC time constant element which is responsive for the duration of said electrical output to create a ramp waveform which, if said electrical output exceeds said predetermined length of time, reaches a magnitude appropriate for causing transistor means to maintain said electrical output independently of its normal dependence on said particular criterion, said timing means further comprising a discharge circuit through which the ramp waveform can decay following the normal duration of said electrical output.

Suitably, the rate of decay afforded by said discharge circuit would be appropriate for resetting the time constant element during the periods between successive electrical outputs of successive anti-lock cycles. The resetting time may be approximately equal to the duration of a normal electrical output which will just not operate the timing means.

In further considering the nature of the invention reference will now be made by way of example to the accompanying drawings in which:

FIG. 1 is a block diagram of an anti-lock vehicle brake system of the character referred to;

FIG. 2 is a block diagram of the control circuit means of an anti-lock vehicle brake system of the character referred to;

FIGS. 4 and 5a – 5f show explanatory waveform diagrams and curves.

Figure 1:
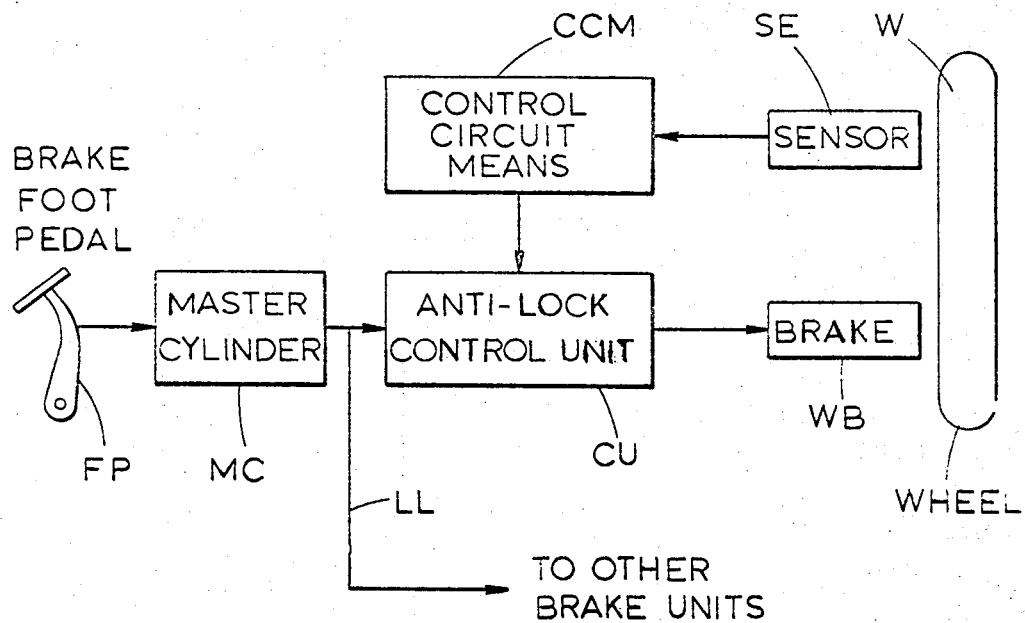

Referring to the drawings, FIG. 1 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel sensor SE applies electrical pulses related (e.g. proportional) to wheel rotational movement to a control circuit means CCM. The anti-lock control unit CU would include control valve means which is arranged for actuation in response to an electrical output from the control circuit means CCM to relieve braking pressure applied to the wheel brake WB. This system is of the character previously referred to, and in the present instance in which the control circuit means is in accordance with FIGS. 2 and 3, as will be described, the electrical output would be produced from the control circuit means CCM when the deceleration of the wheel is in excess of a predetermined value.

As indicated by the lead LL, separate systems as shown in FIG. 1 (with a common fluid pressure source) may be provided in respect of each road wheel of a vehicle, but it would also be possible to provide a single system for two (rear) wheels driven by a vehicle propellor shaft with a sensor associated with the shaft for producing the electrical signals related to wheel rotational movement. As an alternative, a single antilock control unit including control valve means may be provided in common for all the road wheels of a vehicle. In this case, each road wheel would have its own wheel sensor and associated control circuit means and any of the latter would provide an electrical output to actuate the control valve means when the appertaining wheel tends towards a locked condition. A particular form of anti-lock vehicle brake system of the character referred to, to which the present invention can be applied, is disclosed in a co-pending U.S. Pat. application Ser. No. 215,622, filed Jan. 5, 1972.

Figure 2:
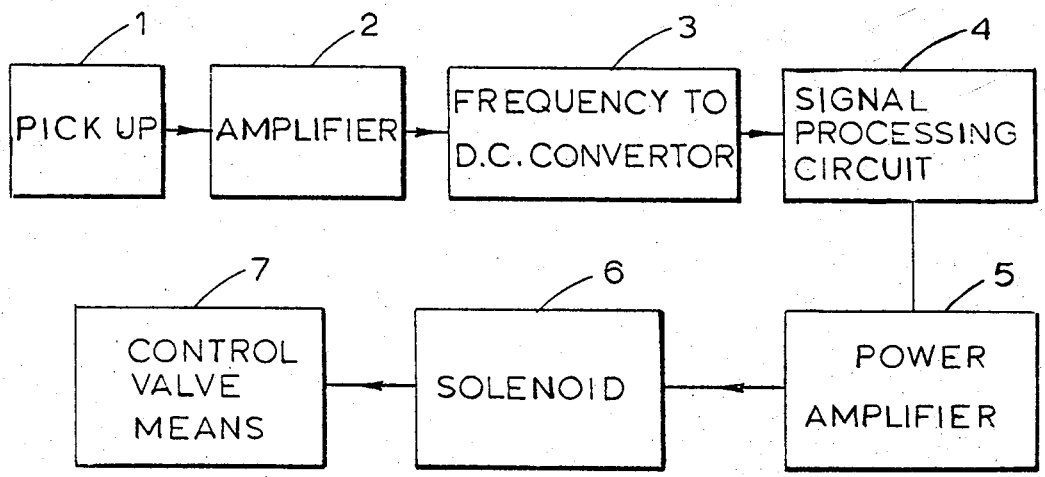

Turning now to FIG. 2, the control circuit means represented by the block diagram there shown is responsive to pulses related to rotational movement of a vehicle wheel. These pulses may be produced by an electromagnetic pick-up 1 which is associated with a ferromagnetic toothed ring rotatable with the wheel to sense change of flux as each tooth of the ring passes it and is succeeded by a gap as the wheel revolves. The pulse output from the pick-up 1 is amplified and limited by an amplifier 2, and the resulting square wave output is applied to a frequency-to-DC convertor 3 which is responsive to the square wave output to produce an output voltage of a magnitude related to the frequency of the pulses supplied by the pick-up 1. This output voltage is applied to a signal processing circuit 4 which is responsive to produce an electrical output when wheel deceleration exceeds a predetermined value, as signified by the output voltage from the convertor 3. The output from the circuit 4 is amplified by a power amplifier 5 and the output from the power amplifier 5 is utilized to operate a solenoid 6 which is adapted to actuate control valve means 7 of an anti-lock vehicle brake system.

Figure 3:
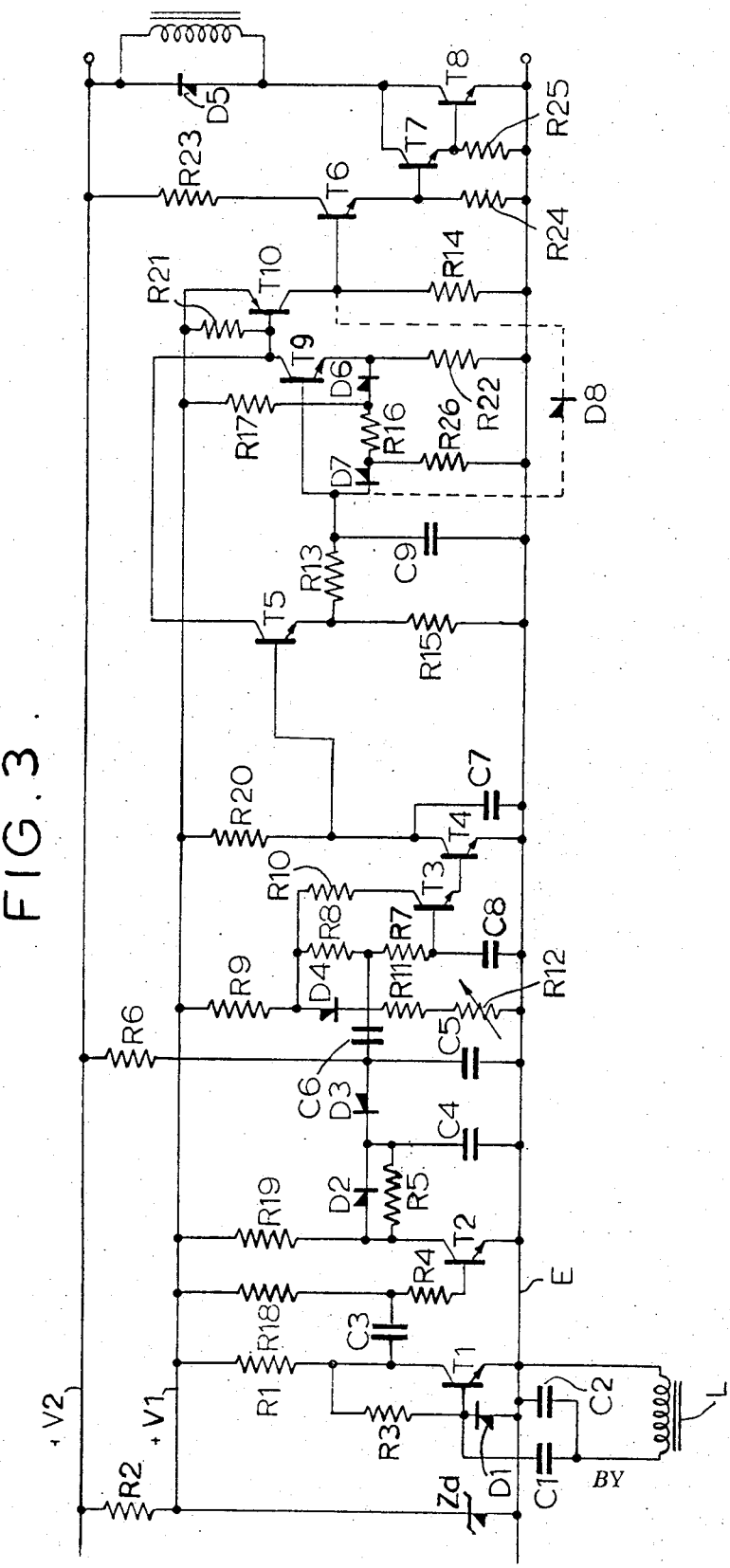
FIG. 3 is a circuit diagram of the control circuit means of FIG. 2 and including timing means according to the invention.

The circuit diagram of the control circuit means shown in FIG. 3 comprises a transistor T1 having its base connected via a capacitor C1 to one end of an output coil L of a pick-up device (not otherwise shown) which is arranged to produce an alternating (pulse) input signal for application to the base of transistor T1. The other end of the coil L is connected to a ground line E. The collector of the transistor T1 is connected to a stabilized positive voltage line +V1 via a collector resistor R1, and its emitter is connected directly to the ground line E. A capacitor C2 serves to remove unwanted interference in the alternating input signal from the coil L. The stabilized voltage +V1 is provided by a Zener diode Zd which is connected in series with a resistor R2 between the ground line E and a supply voltage line +V2. A diode D1 serves to prevent the DC bias at the base of transistor T1, as provided by a resistor R3 connected between the base and collector of this transistor, from shifting due to the rectification of the alternating input signal by the base/emitter diode of the transistor T1. When the circuit is energized by the application of a suitable supply voltage across the supply voltage line +V2 and the ground line E, the transistor T1 is initially biased at the threshold of conduction by a bias voltage which is present at its base. This bias voltage comprises the voltage drop across the resistor R3 due to current flow therethrough from collector to base. Upon the application of an alternating input signal from the coil L to the base of transistor T1, the transistor is rendered conductive in response to each cycle of the input to effect amplification and limiting at the pulse train frequency. The resulting output at the collector of transistor T1 is a square wave voltage. The transistor T1 and associated components comprise the amplifier 2 in FIG. 2.

The square wave output voltage produced at the collector of transistor T1 is coupled into the base of a transistor T2 via a capacitor C3. The values of capacitor C3 and a base resistor R4 for transistor T2 are chosen so that the transistor T2, which is normally conductive, is rendered non-conductive to produce a positive pulse of fixed length at its collector for each cycle of square wave voltage coupled into its base. Each such positive pulse charges up a capacitor C4 through a diode D2 to the stabilized voltage +V1. At the termination of each positive pulse at the collector of transistor T2, the capacitor C4 commences to discharge exponentially through a resistor R5 and transistor T2. When the voltage across the capacitor C4 becomes negative with respect to the voltage across a capacitor C5, a diode D3 becomes forward biased so that capacitor C5 also commences to discharge through the diode D3, but at a much slower rate because its discharge time constant is much longer than the discharge time constant of capacitor C4. However, each time capacitor C4 is being re-charged, diode D3 is back-biased, thus allowing capacitor C5 to charge up via a resistor R6 which is connected in series therewith across the voltage supply line +V2 and the ground line E. The components T2, D2, R5, D3, C4, C5 and R6 essentially comprise the frequency-to-DC convertor 3 in FIG. 3. There is produced across capacitor C5 an output voltage whose value is related to the input frequency of the alternating input signal from the coil L, and may thus be termed a speed signal as it is directly related to wheel speed. This output voltage (speed signal) across capacitor C5 is coupled to the base of a normally conductive transistor T3 via a capacitor C6 and a resistor R7. The value of this capacitor C6 and the value of a resistor R8, to which the capacitor is also coupled, determine a selected wheel deceleration at which transistor T3 and a further normally conductive transistor T4 are rendered non-conductive in response to the value of speed signal then obtaining to produce an electrical output which causes a normally non-conductive transistor T5 to become conductive. This electrical output is terminated when the speed signal voltage across capacitor C5 assumes a value signifying that the wheel has reached the speed it would have been doing if it had continued to decelerate at said predetermined value of deceleration from the speed it was doing when at the instant transistor T3 was rendered non-conductive. The circuit operation to achieve the foregoing is that the transistor T3 is normally conductive due to current flow into its base via resistors R7 and R8 and a resistor R9 from the stabilized voltage +V1. However, as the value of the output voltage across capacitor C5 decreases due to an increase in wheel deceleration, the voltage at the input side of capacitor C6 decreases correspondingly to cause some of the current through the resistor R8 to be diverted from the base of transistor T3 to the output side of capacitor C6. When the predetermined value of wheel deceleration has been exceeded, so much of the current has been diverted from the base of transistor T3 that this transistor is rendered non-conductive, as aforesaid. The current through resistors R7 and R8 is normally about 10 times the current needed to maintain the two transistors T3 and T4 conductive so that the predetermined value of wheel deceleration at which transistor T5 becomes conductive is virtually independent of the gains of the transistors T3 and T4. A resistor R10 in the collector circuit of transistor T3 serves to limit the base current of transistor T4. A capacitor C7 connected between the collector of transistor T4 and the ground line E serves to prevent spurious oscillation of the circuit at high frequencies. A capacitor C8 in the base circuit of transistor T3 makes the circuit less sensitive to ripple in the output voltage across capacitor C5. A diode D4 serves to stabilize the base current of transistor T3 against temperature changes. This diode D4 is connected in series with resistor R9 and two further resistors R11 and R12 between the stabilized voltage +V1 and the ground line E. The resistor R12 is a variable resistor by which the predetermined value of wheel deceleration can be varied.

The resistor R7 provides what may be termed a "back-lash" feature which prevents spurious response of the circuit due to momentary decreases of wheel speed as may be produced by "whipping" in a vehicle's suspension. The presence of the resistor R7 ensures that the wheel is required to decrease its speed by more than a fixed amount at a rate in excess of said predetermined value of wheel deceleration before transistors T3 and T4 are rendered non-conductive. To achieve this, the value of resistor R7 is chosen so that the voltage drop across it due to current flow into the base of transistor T3 determines said fixed amount of decrease in wheel speed. Thus, it is not until the current through resistor R7 has been reduced sufficiently to remove the voltage drop across it that transistor T3 (and transistor T4) will become non-conductive. The components C6 to C8, R7 to R12, D4, T3 and T4 comprise the signal processing circuit 4 in FIG. 2.

The waveform diagram in FIG. 5a shows typical curves for the speed signal voltage across capacitor C5 for road surfaces having good and poor adhesion. Waveform diagram 5b shows curves of the resulting voltages at the junction of resistors R7 and R8, the voltage V$bl$ being due to the back lash resistor R7 which has to be overcome before transistor T3 is rendered non-conductive. Waveform diagram 5c shows the voltage at the base of transistor T3 for the two cases, and waveform diagram 5d the voltage at the collector of transistor T4.

The circuit of FIG. 3 further includes three transistors T6, T7 and T8 which form the power amplifier 5 in FIG. 2. The output from transistor T8 drives a solenoid S which corresponds to the solenoid 6 in FIG. 2. A diode D5 serves to clip any overshoot voltage on the solenoid S when it is switched off thereby preventing too high a voltage from being applied to the collector of transistor T8.

If the collector of transistor T4 were connected to the base of transistor T6, then the duration of energization of the solenoid S in any anti-lock cycle would correspond to the period that transistor T4 is rendered non-conductive; i.e. the duration of solenoid energization for road surfaces having good and poor adhesion would correspond to the square wave pulse periods shown in waveform diagram 5d. However, in accordance with the present invention, the circuit of FIG. 3 includes a delay element comprising transistor T5 and two further transistors T9 and T10 which operates to increase the period of solenoid energization in the event that transistor T4 remains non-conductive for longer than a predetermined period which is indicative that antialock braking is taking place on a road surface with poor adhesion.

In this delay element, transistor T5 is normally non-conductive and is rendered conductive when transistor T4 is rendered non-conductive, as aforesaid. When transistor T5 is rendered conductive, it renders transistor T10 conductive and there is produced across a resistor R14 an output voltage which renders transistor T6 conductive to effect solenoid energization. Also, when transistor T5 is rendered conductive, a capacitor C9 is charged up via a resistor R13. If transistor T5 conducts for a sufficiently long time, then transistor T9 (which is normally non-conductive because its emitter is held positive with respect to its base by a diode D6) is rendered conductive by the rising voltage on capacitor C9 and will thus supply current to the base of transistor T10. When the transistor T5 is rendered nonconductive again, due to transistor T4 becoming conductive again, the transistor T5 no longer influences the conduction of transistor T10, and capacitor C9 will discharge through resistor R13 and a further resistor R15. Transistor T9 will continue to supply current to the base of transistor T10 to maintain the latter conductive until the voltage across capacitor C9 becomes insufficient to maintain transistor T9 conductive. Waveform diagram 5e shows the voltage on capacitor C9, V$t$ being the triggering level at which transistor T9 is rendered conductive. Waveform diagram 5f shows the output voltage at the collector of transistor T10 for solenoid energization. It can be seen that the duration of this output voltage will equal that of the input voltage to the delay element, i.e. the voltage at the collector of transistor T4 as shown in waveform diagram 5d, if the duration of this input voltage is too short to allow capacitor C9 to be charged up to a voltage which will render transistor T9 conductive.

For the above-described operation of the delay element to be repeated exactly, sufficient time must be allowed between successive input voltage pulses to the delay element for the capacitor C9 to be discharged to a reset voltage Vs (see the waveform diagram in FIG. 5e) as determined by a diode D7. This diode D7 clamps the voltage on capacitor C9 to the reset voltage as provided by resistors R26, R16 and R17 which form a potential divider across the stabilized voltage +V1 and the ground line E. The time for the circuit to become fully reset is suitably approximately equal to the duration of an input voltage (pulse) which will just not operate the circuit. The reset time can be reduced to a very low value by connecting a diode D8 as shown in dotted lines in FIG. 3. The effect of this diode D8 on the voltage on capacitor C9 is shown in dotted lines in the waveform diagram of FIG. 5e.

Figure 4:
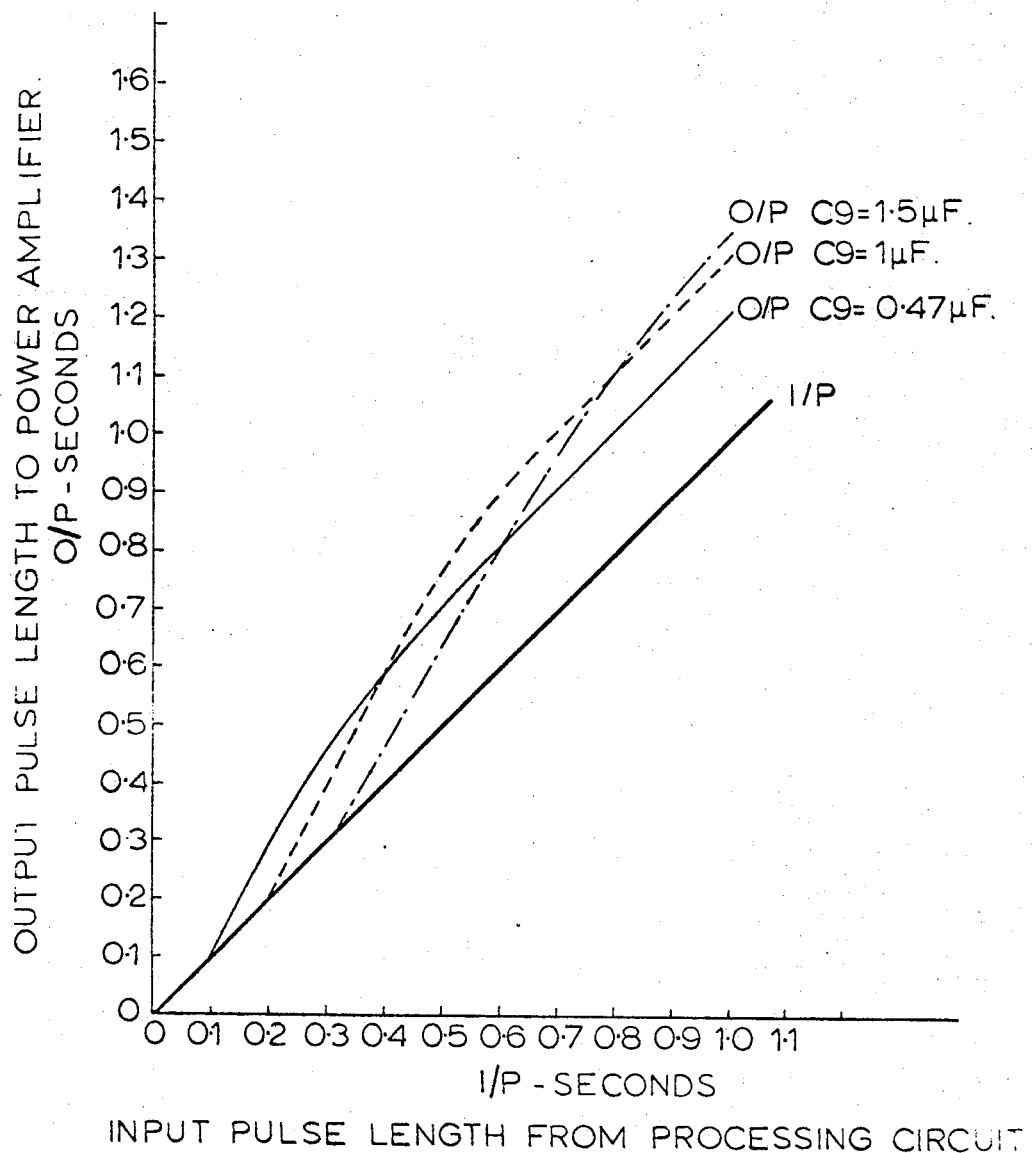

By varying the size of the capacitor C9, the performance of a signal processing circuit embodying the delay element can be modified to suit the characteristics of different types of brake release mechanism. For example, a mechanism which released the brake pressure slowly may normally have its solenoid energized for, say, 200 milliseconds per anti-lock cycle on a road surface having good adhesion. In this case, capacitor C9 would be chosen to be 1 μF when the circuit of FIG. 3 has component types and values as given hereinafter. A mechanism which released brake pressure so that its solenoid was normally energized for only 100 milliseconds per anti-lock cycle on a road surface having good adhesion would require capacitor C9 to be 0.47 μF. FIG. 4 shows curves of input pulse length against output pulse length for three different values of capacitor C9.

Suitable components and component values for the circuit diagram of FIG. 3 are as follows for a wheel diameter of 2 feet having 60 teeth/revolution on a toothed ring attached thereto. A typical output voltage from the magnetic pick-up would be 1 volt peak at 100 cps (7 mph) and 10 volts peak at 1,000 cps., approx. 70 mph.

Resistors
| | | |
|---|---|---|
| R1–18K ohms | R10–470K ohms | R19–3.9K ohms |
| R2–150 " | R11–150 " | R20–33K " |
| R3–1M " | R12–10K " | R21–330K " |
| R4–1K " | R13–500K " | R22–100K " |
| R5–15K " | R14–39K " | R23–150 " |
| R6–150K " | R15–100K " | R24–10K " |
| R7–33K " | R16–1.5K " | R25–1K " |
| R8–470K " | R17–4.7K " | |
| R9–10K " | R18–330K " | |

| Capacitors | Transistors | |
|---|---|---|
| C1–.22μF | T1–BC 108 | (Mullard) |
| C2–0.1 μF | T2–" | " |
| C3–022 μF | T3–" | " |
| C4–0.1 μF | T4–" | " |
| C5–1.0 μF | T5–BC 109 | " |
| C6–1.0 μF | T6–BC 108 | " |
| C7–2KpF | T7–BFY52 | " |
| C8–0.1μF | T8–BDY10 | " |
| C9–1F | T9–BC 109 | " |
| | T10–BCY 32 | " |

| Diodes | Voltages |
|---|---|
| Zd–8.2v zener | (Mullard)+V1–8.2v stabilized |
| D1–type OA202 | " +V2–12v |
| D2–" | " |
| D3–" | " |
| D4–" | " |
| D5–" BYZ " 10 | " |
| D6–" OA202 | " |
| D7–type OA202 | (Mullard) |
| D8–" | " |

In the circuit of FIG. 3, transistors of opposite type to those shown may be used with suitable adjustment of the voltage supply lines.

What we claim is:

1. An anti-lock vehicle brake system comprising, means for deriving an electric signal related to the rotational movement of a vehicle wheel, means responsive to said signal for deriving a wheel speed voltage proportional to the wheel speed, control valve means for adjusting the vehicle brake pressure, a signal processing circuit coupled to said control valve means and responsive to said speed voltage to produce an output signal when the speed voltage indicates that wheel deceleration exceeds a predetermined value, and timing means coupled to the output of the signal processing circuit and to said control valve means and operable to increase the length of time that the control valve means is actuated in the event that the duration of said output signal exceeds a predetermined length of time which is indicative that braking is being effected on a surface having poor adhesion.

2. An anti-lock vehicle brake system as claimed in claim 1, wherein said timing means comprises an RC time constant element responsive to said output signal to produce a signal with a ramp waveform, transistor means controlled by said ramp signal so that, in the event the duration of said output signal exceeds said predetermined length of time, the ramp signal reaches a magnitude which operates the transistor means to maintain said output signal independently of its normal dependence on said signal processing circuit, said timing means further comprising a discharge circuit through which the ramp waveform can decay following the normal duration of said output signal.

3. An anti-lock vehicle brake system as claimed in claim 2, wherein the rate of decay provided by said discharge circuit is appropriate for resetting the time constant element during the periods between successive electrical outputs of successive anti-lock cycles.

4. An anti-lock vehicle brake system as claimed in claim 3, wherein the discharge circuit provides a resetting time approximately equal to the duration of a normal electrical output which will just not operate the timing means.

5. A vehicle anti-lock brake system comprising, means for producing an electric signal with a frequency proportional to wheel speed, means for converting said signal to a proportional speed voltage, control valve means actuable to relieve the vehicle brake pressure during an anti-lock cycle, a signal processing circuit connected between said signal converting means and said control valve means and responsive to the speed voltage to produce an output control signal for actuating said control valve means when the speed voltage indicates that wheel deceleration exceeds a predetermined reference value, and timing means responsive to said output signal for effecting prolonged actuation of the control valve means independently of said output signal whenever the duration of the output signal exceeds a predetermined time period indicative that the wheel is being braked on a road surface with poor adhesion.

6. A system as claimed in claim 5 wherein said timing means comprises, a controlled switching device coupled to said control valve means for effecting said prolonged actuation thereof, a resistor and capacitor connected together to form an RC circuit and to the control electrode of said switching device to control the conduction therein, and means responsive to said output signal for connecting said RC circuit to a source of voltage in synchronism with the receipt of said output signal.

7. A system as claimed in claim 6 wherein said timing means further comprises, means for biasing said switching device into a cut-off state, and wherein said RC circuit produces a signal with a ramp waveform which triggers said switching device into conduction when the duration of the output signal exceeds said predetermined time period.

8. A system as claimed in claim 7 further comprising a second resistor coupled to said capacitor to provide a discharge circuit therefor, said discharge circuit being rendered effective by said connecting means to discharge the capacitor upon the termination of said output signal.

* * * * *